US006859557B1

(12) United States Patent
Uyttendaele et al.

(10) Patent No.: US 6,859,557 B1
(45) Date of Patent: Feb. 22, 2005

(54) SYSTEM AND METHOD FOR SELECTIVE DECODING AND DECOMPRESSION

(75) Inventors: Matthew T. Uyttendaele, Seattle, WA (US); Richard S. Szeliski, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 546 days.

(21) Appl. No.: 09/611,649

(22) Filed: Jul. 7, 2000

(51) Int. Cl.⁷ .............................................. G06K 9/36
(52) U.S. Cl. ..................................... 382/235; 382/240
(58) Field of Search ............................... 382/232–248, 382/284–290; 348/36–40

(56) References Cited

U.S. PATENT DOCUMENTS

| | | | | |
|---|---|---|---|---|
| 6,043,837 A | * | 3/2000 | Driscoll et al. | 348/36 |
| 6,081,551 A | * | 6/2000 | Etoh | 375/240 |
| 6,323,858 B1 | * | 11/2001 | Gilbert et al. | 345/419 |
| 6,337,683 B1 | * | 1/2002 | Gilbert et al. | 345/418 |
| 6,337,708 B1 | * | 1/2002 | Furlan et al. | 348/36 |
| 6,470,378 B1 | * | 10/2002 | Tracton et al. | 709/203 |
| 6,540,681 B1 | * | 4/2003 | Cheng et al. | 600/443 |

OTHER PUBLICATIONS

Altunbasak, "Afast method of reconstructing high–resolution panoramic stills from MPEG–compressed video" IEEE Second Workshop on Multimedia Signal Processing, 1998, pp. 99–104, Dec. 1998.*
"Panoramic Image Mosaics", Heung–Yeung Shum, Richard Szeliski, IEEE Computer Graphics and Applications, Mar. 1996.
Catadioptric Omnidirectional Camera, Shree Nayar, Proc. Of IEEE Conference on Computer Vision and Pattern Recognition, Puerto Rico, Jun. 1997.

* cited by examiner

Primary Examiner—Jingge Wu
(74) Attorney, Agent, or Firm—Lyon & Harr, LLP; Katrina A. Lyon

(57) ABSTRACT

A system and process that segments the video frames, thereby allowing selective decoding and possible decompression of just those specific regions that are to be viewed. Each frame is segmented into a plurality of regions such that the segmented regions correspond from one frame to the next. Each segmented region is then encoded separately. Once the frames have been segmented and encoded (which may include compressing them), they can be transferred to the viewer. One way to transfer the files involves an interactive approach and network connection. A viewing system identifies what portions of the scene the user wants to view and informs a server of the portions of the frame of the video that are needed to render the desired view of the scene to the user. The server then transfers only the requested portions of the next frame to the viewer. This process is repeated for each frame of the video. If an interactive approach is not possible, all the files associated with each segmented region of a panoramic frame are sent to the viewer. Once received, the viewer selectively processes and decompresses (if necessary) only those segments required to display the desired portion of the scene. The segmented and encoded frames can also be stored on a storage medium that is accessible by the viewer. In this case, the viewer reads only those segments needed to render the desired view. Thus, here too the viewer selectively processes only those segments required to display the desired portion of the scene.

28 Claims, 6 Drawing Sheets

SYSTEM AND METHOD FOR SELECTIVE DECODING AND DECOMPRESSION

BACKGROUND OF THE INVENTION

1. Technical Field

This invention is directed towards a system and process for selectively decoding and decompressing portions of the frames of a panoramic video.

2. Background Art

Panoramic video is constructed of a sequence of frames, each of which depicts a 360 degree view of the surrounding scene or some significant portion thereof. These frames are played in a panoramic video viewer in sequence to produce a video of the scene. A panoramic video viewer may allow a user to navigate through the scene by processing user commands to pan right, left, up or down. In other words, a person viewing the panoramic video can electronically steer his or her viewpoint around in the scene as the video is playing. Such a panoramic viewer is the subject of a co-pending application entitled "A System and Process for Viewing Panoramic Video", which has the same inventors as this application and which is assigned to a common assignee. The co-pending application was filed on Jul. 7, 2000 and assigned Ser. No. 09/611,987, and is now U.S. Pat. No. 6,559,846. The disclosure of this patent is hereby incorporated by reference.

As can be envisioned from the above discussion of viewing a frame of a panoramic video, only a portion of the overall image is displayed to the user. Thus, much of the overall frame is not viewed at any one time. However, typically the entire panoramic video frame is input and processed by the viewer.

In general, the transmission and storage of panoramic view frames present difficulties due to the amount of information they contain. In the case where these frames are transferred to the viewer over a network, such as the Internet, they will typically be compressed in some way. Unfortunately, even in a compressed form these frames represent a considerable amount of data, and so present problems in transmitting them to the viewer, as well as processing and storing them once received. These large files are slow to be transferred to a viewer. Additionally, to process this image data in real-time requires large amounts of Random Access Memory (RAM) as well as large powerful processors. Even in a case where the frames are input to the viewer directly from a storage medium, such as a hard drive, CD, DVD, or the like, their size, especially if not compressed, imposes considerable storage and processing requirements on the viewer.

SUMMARY

The present invention overcomes the aforementioned limitations with a system and process that segments the panoramic video frames, thereby allowing selective decoding of just those specific regions that are to be viewed. Specifically, each frame is segmented into a plurality of regions. The frames are segmented in the same way such that the segmented regions correspond from one frame to the next. Each segmented region is then optionally compressed and encoded separately. Thus, separate video streams are generated for each of the segmented regions of each panoramic video frame.

Once the panoramic video frames have been segmented, compressed (if desired), and encoded, they are ready for transfer to the viewer. This can be accomplished in a number of ways, each with particular advantages. One way to transfer the frames involves an interactive approach. Essentially, the viewer, such as the one described in the aforementioned co-pending application, identifies the portions of the scene the user is currently viewing. In the case of a network connection, the viewer then informs a server of the segments of the next frame of the video that are needed to render the desired view of the scene to the user. The server then transfers only the requested segments of the next panoramic video frame to the viewer. This process is repeated for each frame of the panoramic video.

This foregoing interactive embodiment has the advantages of preserving the bandwidth utilized when sending data from the server to the viewer since only the data actually used by the viewer is transmitted. In addition, the processing and storage requirements of the viewer are minimized, as only those portions of each frame that are needed have to be decoded, decompressed and stored.

Of course, in some circumstances an interactive approach will not be desired or possible. In such cases, the system and process of the present invention still has advantages. Granted, all the segmented regions of each panoramic frame must be sent to the viewer as there is no feedback as to which regions are needed. However, once received, the viewer can selectively process and decompress (if necessary) only those segments required to display the portion of the scene currently being viewed by the user. Thus, the processing and storage requirements of the viewer are minimized.

This panoramic video segmentation technique according to the present invention also has some of the same advantages when employed with a direct connection between the viewer and some type of storage media. Specifically, the segmented panoramic video frames are stored on a storage medium (e.g., hard drive, CD, DVD) to which the viewer has direct access. Thus, the viewer can determine which segments of each panoramic video frame are needed to produce the desired view to the user, and reads only these segments from the storage medium. In this way the processing and storage requirements of the viewer are minimized.

In regard to the encoding of the panoramic frame segments, each frame segment is appended with an identifier that identifies what frame and what frame segment "location" (i.e., what region of the panoramic frame) the accompanying image data relates to. A separate file can be created for each video stream corresponding to a certain frame segment region. Alternately, one file could be created for all segment regions, with separate frames and frame segments being identified by the aforementioned identifiers.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
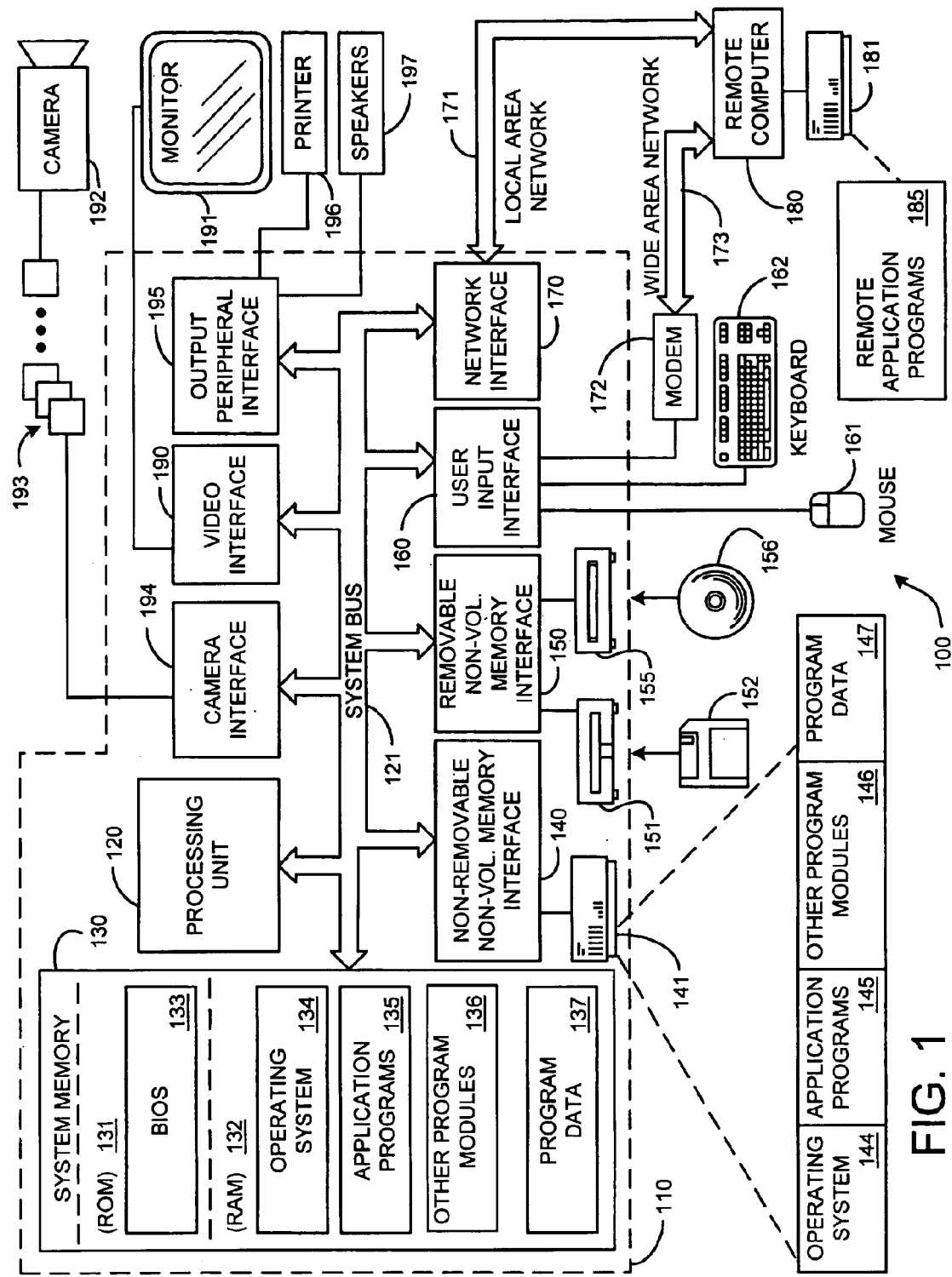
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

Frame Segmenting, Encoding and Compression

Figure 2:
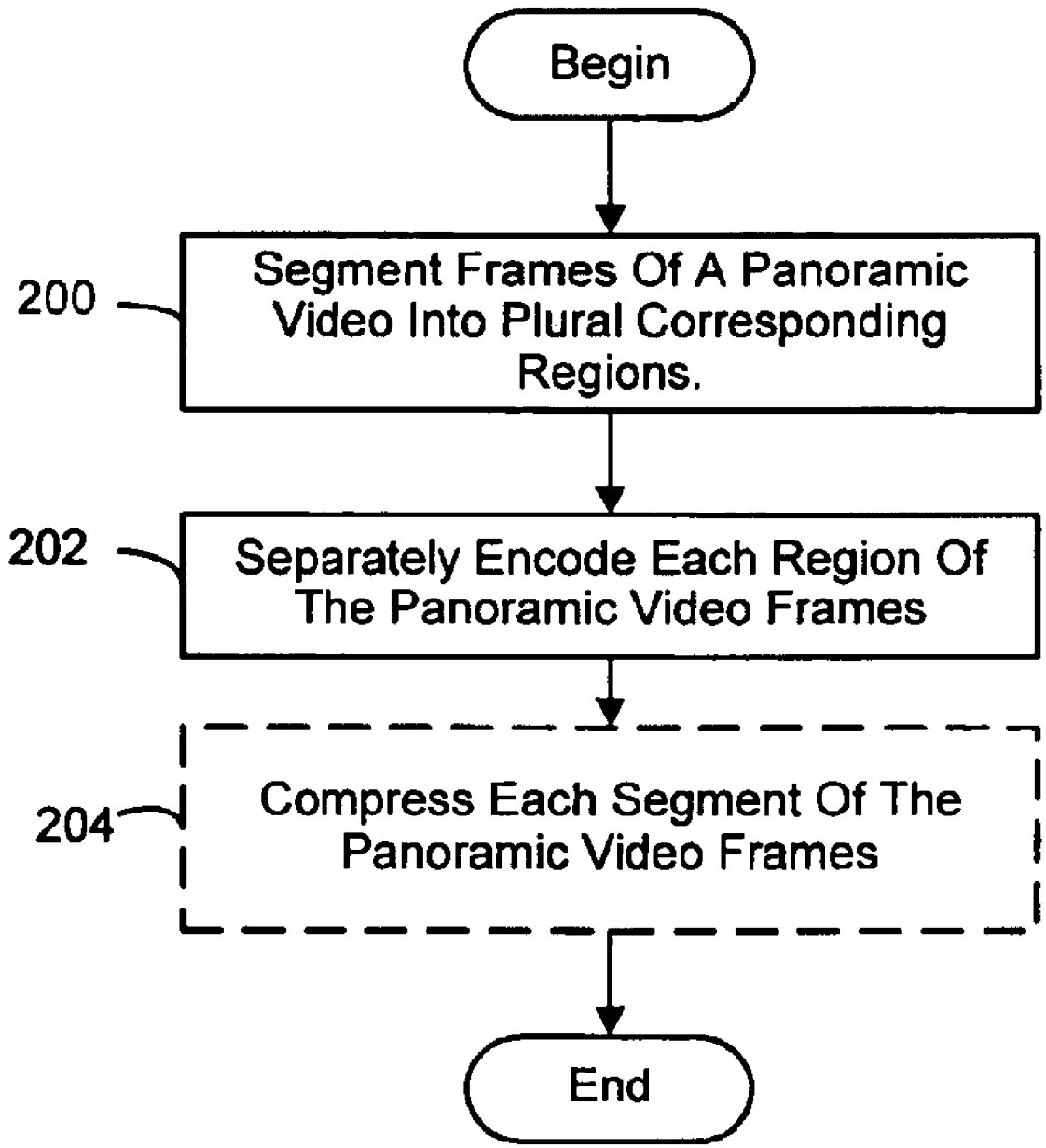
FIG. 2 is a flow diagram of a method for segmenting and encoding a video frame according to the present invention.

As shown in FIG. 2, the system and method according to the present invention involves segmenting the panoramic video frames, thereby allowing selective decoding and possibly decompression of just those specific regions that are to be viewed. Specifically, each frame is segmented into a plurality of regions (process action 200). Each frame is segmented in the same way such that the segmented regions correspond from one frame to the next. Each segmented region is then encoded separately, as shown in process action 202. Further, each segment of the panoramic video frames can be optionally compressed, as shown in process action 204.

Figure 3A:
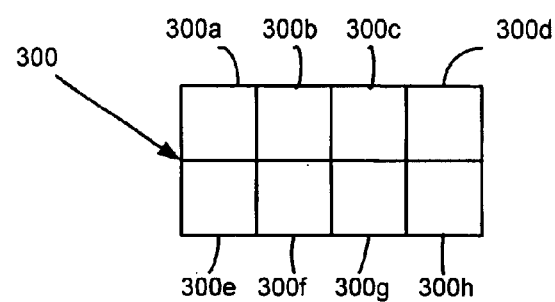
FIG. 3A is a diagram depicting a segmented panoramic video frame.

In regard to the segmenting of each frame of a panoramic video, it is noted that any segmentation pattern can be employed as long as the same pattern is used for each frame. For example, the panoramic video frame depicted in FIG. 3A is divided into square regions. However, it is noted that the present invention is not limited to the depicted segmentation pattern. Rather any pattern desired can be employed.

Figure 3B:
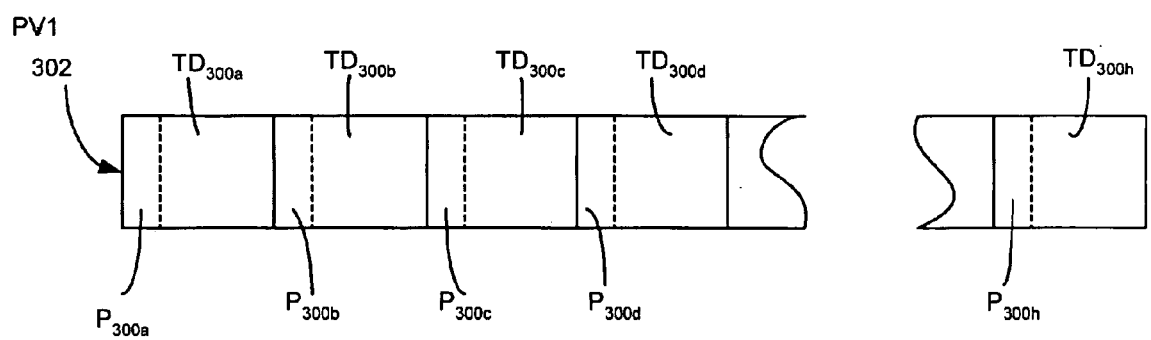
FIG. 3B is a diagram depicting a possible file structure for use with the present invention.

In regard to the encoding of the panoramic frame segments, each frame segment is appended with an identifier. This identifier at a minimum identifies what frame and what frame segment "location" (i.e., what region of the panoramic frame) the accompanying image data relates to. A separate file can be created for each video stream corresponding to a certain frame segment region. Alternately, one file could be created for all segment regions, with separate frames and frame segments being identified by the aforementioned identifiers. FIG. 3A depicts a segmented video frame 300, showing the various segmented regions of the frame, 300a through 300h. Referring to FIG. 3B, a diagram is provided that conceptually illustrates a possible configuration of the above-described encoded file that corresponds to the segmented video frame shown in FIG. 3A. The file 302 includes a data structure formed from a plurality of elements or fields. For example, the file includes a plurality of elements associated with the image or texture map data representing each frame segment of the panoramic video, $TD_{300a}$ through $TD_{300h}$. Each segment should also have associated with it an index portion or indicator, $P_{300a}$ though $P_{300h}$, identifying the frame and the frame segment locations of the segment represented.

In regard to compressing the panoramic frame segments, a common way of compressing video for transfer over a network is by using the MPEG4 compression method. In very general terms, MPEG compression works by comparing successive frames in a series of frames looking for items that are similar in these frames. Once the similar items have been identified, the MPEG compression algorithm transmits the similar items only once and subsequently only sends the differences (or non-similar items) identified. While it would not be possible to use this compression method to first compress the frames of the panoramic video and then attempt to segment them, it is possible to segment the frames first and then separately compress each of the series of corresponding segmented regions from successive frames. Thus, compressed video streams can be generated from each of the corresponding segmented regions of the panoramic video frames. In the context of the system and method according to the present invention, if the data files are compressed, then the corresponding data structure will contain compressed data as elements in place of the original uncompressed data.

Transfer to the Viewer and Decoding

Once the panoramic video frames have been segmented, compressed (if desired), and encoded, they are ready for transfer to the viewer. This can be accomplished in a variety of ways, as will now be described.

Figure 4:
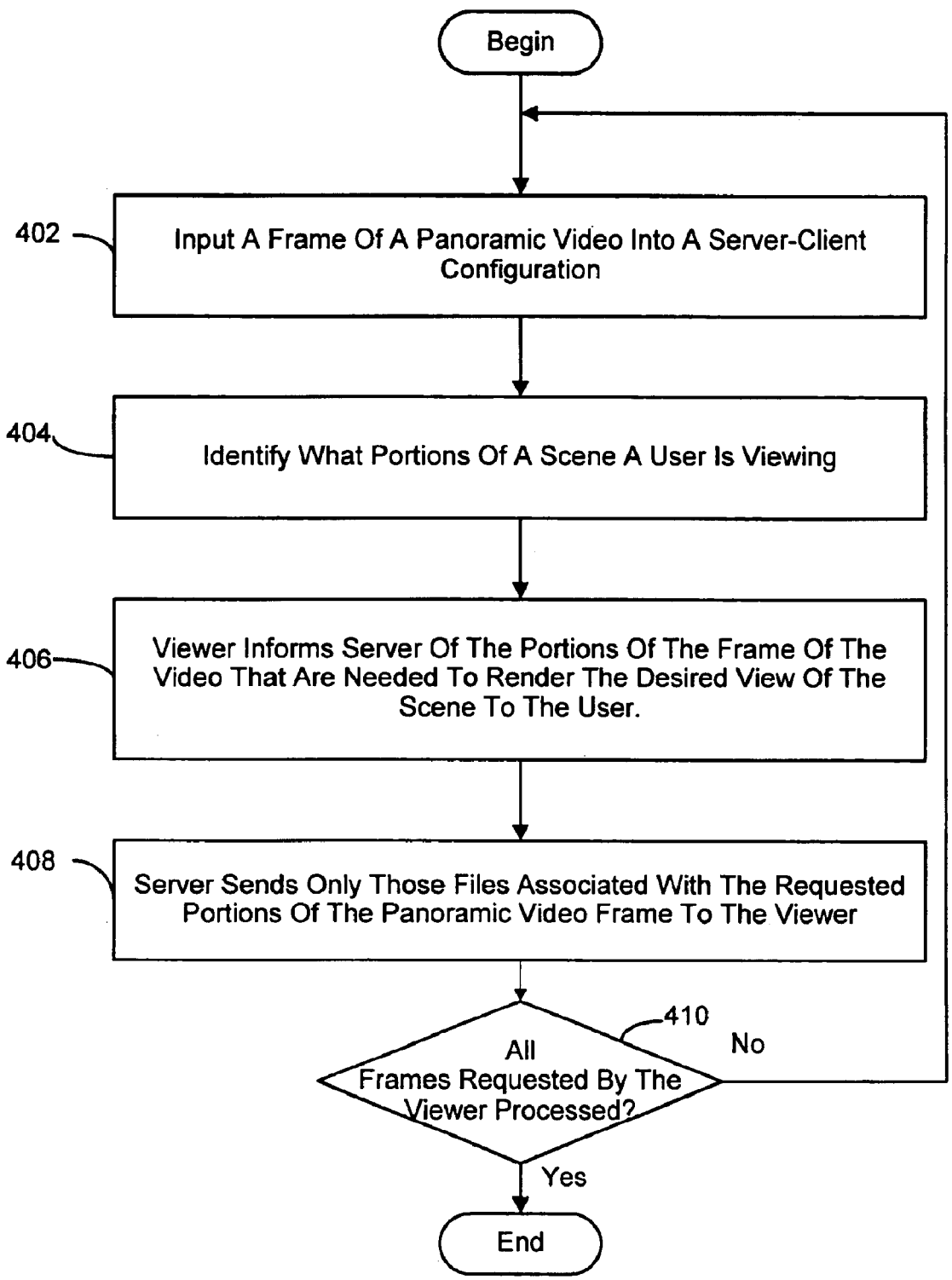
FIG. 4 is a flow diagram outlining transfer of video frames to a viewer in a server—client environment.

Referring to FIG. 4, one way to transfer the files involves an interactive approach. This interactive approach employs a network environment. The viewer is connected to this network and data is transferred to the viewer via this means. A frame of a panoramic video is input, as shown in process action 402. Essentially, the viewer, such as the one described in the aforementioned co-pending application, identifies what portions of the scene the user is currently viewing (process action 404). The viewer then informs a server of the segments of the next frame of the video that are needed to render the desired view of the scene to the user as shown in process action 406. The server then causes only those frame segments associated with the requested portions of the next panoramic video frame to be transferred to the viewer (process action 408). As shown in process action 410, this process is repeated for each frame of the panoramic video.

A standing order system can also be implemented. In such a system, as the user changes viewpoints within the scene being viewed, different segment regions of subsequently transferred frames will be needed to prepare the desired view. In such a standing order system the viewer will request the desired frame segments and these requested segments are sent for each consecutive frame until a new request is sent by the viewer. Once a new request is received the server sends a new set of requested frame segments until a new order is received, and so on, until the entire video has been viewed.

In order to assist the panoramic video viewer in identifying the desired segmented regions of each panoramic video frame that should be transferred in the case of an interactive network connection, an initialization file approach can be employed, as it was in the aforementioned co-pending application entitled "A System and Process for Viewing Panoramic Video". The viewer described in the co-pending application, needs certain information to play panoramic videos. The initialization file is used to provide the needed information. Essentially, an initialization file associated with a panoramic video is sent by the server to the viewer prior to the viewer playing the video. In one preferred embodiment, this file includes, among other things, pointers or identifiers that indicate how each frame of the panoramic video can be obtained. Thus, in the case of the present invention, the initialization file would be modified to include identifiers that would indicate how to obtain each frame segment of every frame of the panoramic video. Further, the initialization file indicates the order in which the frame segments should be played. The identifiers would uniquely identify each frame segment of the panoramic video and the viewer uses these identifiers to request the desired frame segments. Specifically, the viewer determines which portion of the scene depicted in a frame of the panoramic video that the person viewing the video wishes to see. It then requests only those segments of each panoramic video frame that are needed to provide the desired view to the user, in the frame order indicated in the initialization file.

The foregoing interactive embodiment has the advantages of preserving the bandwidth utilized when sending data from the server to the viewer since only the data actually used by the viewer is transmitted. In addition, the processing and storage requirements of the viewer are minimized, as only those portions of each frame that are needed have to be decoded, decompressed and stored.

Figure 5:
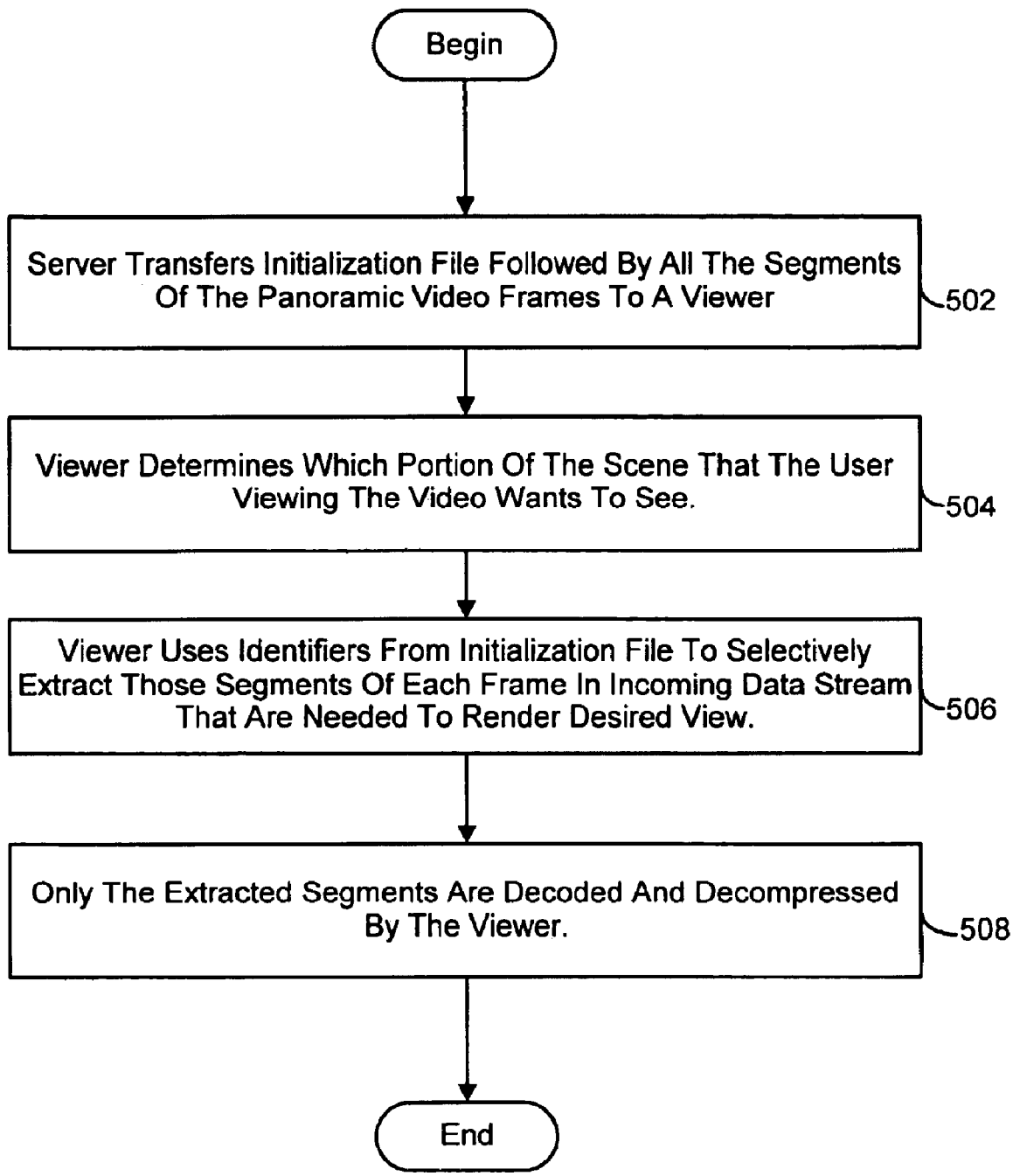
FIG. 5 is a flow diagram outlining transfer of video frames to a viewer that is not in a server-client environment.

Of course, in some circumstances an interactive approach will not be desired or possible. In such cases, the system and process of the present invention can still be advantageously employed. For example, referring to FIG. 5, if the previously-described network connect is employed, but without the ability for the viewer to request the needed segments from the server, the server transfers the initialization file followed by all the segments of every frame to the viewer (process action 502). The viewer next determines which portion of the scene captured in the panoramic video that the person viewing the video wishes to see (process action 504). The viewer then uses the aforementioned identifiers from the initialization file to selectively extract those segments of each frame in the incoming data stream that are needed to render the desired view (process action 506). Only the extracted segments are decoded and decompressed by the viewer (process action 508). Thus, while there is no preservation of network resources, the processing and storage requirements of the viewer are still minimized.

Figure 6:
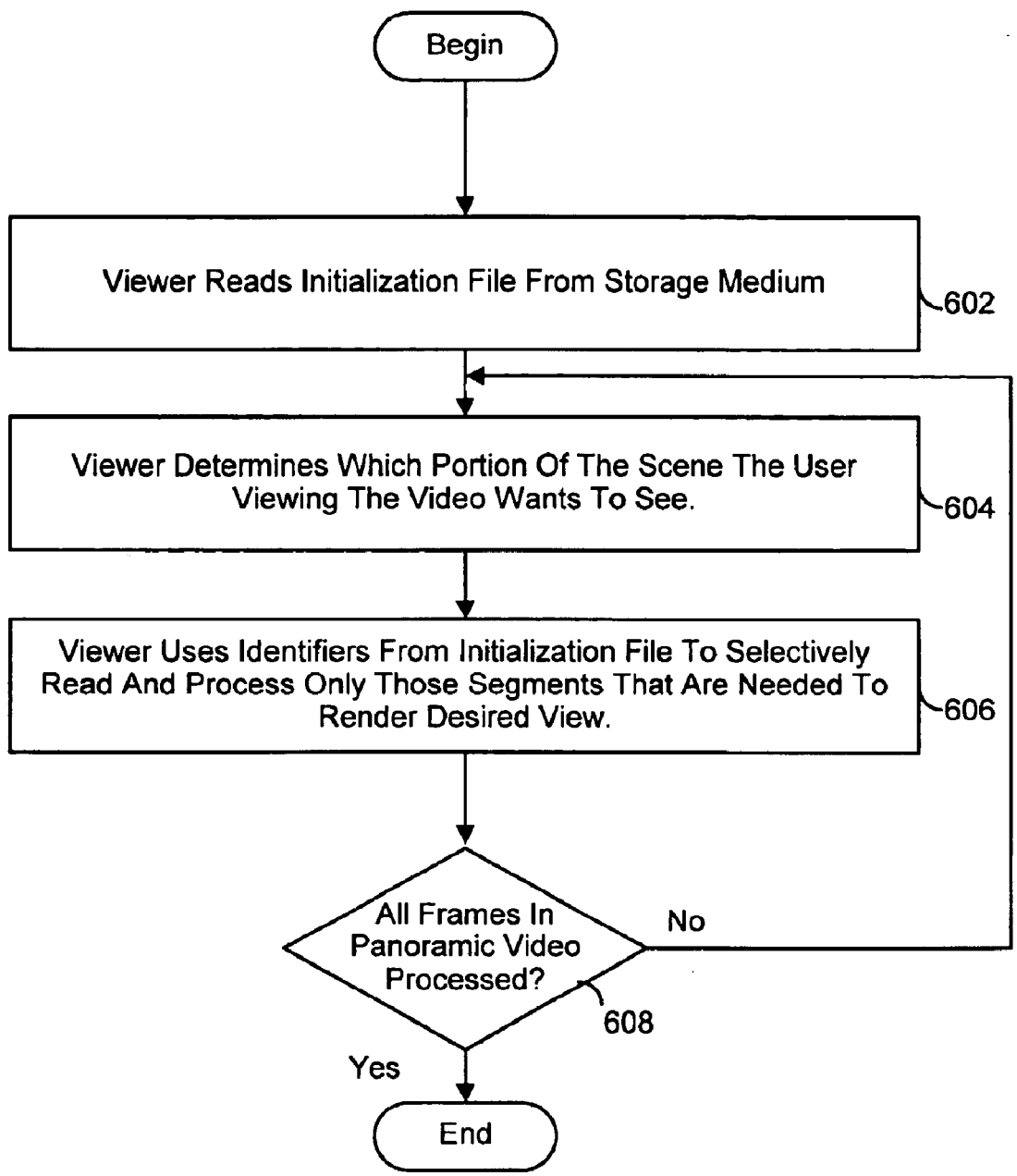
FIG. 6 is a flow diagram outlining an example of the panoramic video segmentation technique in accordance with the present invention.

The panoramic video frame segmentation techniques according to the present invention also have similar advantages when employed with a direct connection between the viewer and some type of storage media (e.g., hard drive, CD, DVD, and the like) where the panoramic video frame segments are stored, since only those portions of the video frame that are needed are read by the o viewer, stored and processed. For instance, referring to FIG. 6 and using the viewer described in the aforementioned co-pending application as an example, the viewer first reads the initialization file from the storage medium (process action 602). In this case the pointers or identifiers provided in the initialization file identify where on the storage medium the viewer can obtain each segment of every frame of the panoramic video being viewed. The viewer next determines which portion of the scene captured in the panoramic video that the person viewing the video wishes to see (process action 604). It then reads and processes only those segments of the current panoramic video frame that are needed to provide the desired view to the user (process action 606). This process is then repeated for each frame of the panoramic video in the order indicated in the initialization file (process action 608).

While the invention has been described in detail by specific reference to preferred embodiments thereof, it is understood that variations and modifications thereof may be made without departing from the true spirit and scope of the invention. For example, the system and method described above is not limited to just frames of a panoramic video. Rather, it could be employed advantageously with the transfer and viewing of any image having a size that exceeds that which will be viewed. In other words, the system and method according to the present invention could apply to any image where only a portion of a scene or image will be viewed on the any one time.

Wherfore, having thus described the present invention, what ic claimed is:

1. A process of encoding frames of a panoramic video so as to allow selective decoding of the frames, comprising the process actions of:

segmenting each frame of the panoramic video into plural corresponding regions; and separately encoding each region of the panoramic video frames, wherein encoding the frame regions of the panoramic video comprises creating at least one data file comprising the data associated with each frame region of each frame of the panoramic video and an indicator appended to the data of each frame region that identifies its corresponding panoramic video frame and its location within that frame.

2. The process of claim 1, wherein the process action of segmenting each frame of the panoramic video comprises an action of employing an identical segmentation pattern for each frame of the panoramic video.

3. The process of claim 1, further comprising the action of decoding only those encoded regions of each panoramic video frame needed to display a prescribed portion of the scene depicted by each frame.

4. The process of claim 1, wherein the process action of separately encoding each region further comprises the process action of separately compressing each region of the panoramic video frames.

5. The process action of claim 1, further comprising the process actions of:
   for each frame of a panoramic video
      obtaining information as to what portion of a scene depicted by the frame under consideration a user wants to view;
      sending only those frame regions associated with the video frame that are needed by a panoramic video viewer to provide the portion of the scene the user wants to view.

6. The process of claim 1, wherein the process action of creating the at least one data file further comprises an action of creating a separate data file for each frame region of the panoramic video.

7. The process of claim 1, wherein the process action of creating the at least one data file further comprises an action of creating a separate data file for each series of correspondingly located frame regions of the panoramic video.

8. The process of claim 1, wherein the process action of creating the at least one data file comprises an action of creating a single data file comprising the data and indicators associated with each frame region of the panoramic video.

9. The process of claim 1, further comprising a process action of sending the at least one data file from a server over a network to a panoramic video viewer resident on a client.

10. The process of claim 9, wherein a user viewing a panoramic video on the panoramic video viewer views only a portion of the scene captured by each frame of the panoramic video, and wherein the viewer identifies what portion of the scene the user wants to view, and where the process action of sending the at least one data file over the network comprises an action of sending all of the data files so as to provide every frame region of every panoramic video frame to the viewer.

11. The process of claim 9, wherein there is two-way communication between the server and the client.

12. The process action of claim 11, wherein a user viewing a panoramic video on the panoramic video viewer views only a portion of the scene captured by each frame of the panoramic video, and wherein the viewer identifies what portion of the scene the user wants to view, and wherein the viewer employs said two-way communication link to the server to request only those frame regions of each panoramic video frame needed to provided the desired view to the user and wherein the process action of creating the at least one data file comprises an action of including only the data and associated indicators corresponding to those frame regions requested by the viewer in the at least one data file sent to the viewer.

13. The process of claim 1, further comprises the process action of storing the at least one data file on a storage medium accessible by a panoramic video viewer.

14. The process action of claim 13, wherein a user viewing a panoramic video on the panoramic video viewer views only a portion of the scene captured by each frame of the panoramic video, and wherein the viewer identifies what portion of the scene the user wants to view, and further comprising the process action of the viewer reading only the elements of the at least one data file corresponding to those frame regions needed to produce the portion of the scene the user wants to view on a frame by frame basis.

15. A system for encoding frames of a panoramic video so as to allow selective decoding of the frames comprising:
   at least one general purpose computing device; and
   a computer program comprising program modules executable by the at least one computing device, wherein the at least one computing device is directed by the program modules of the computer program to,
      segment each frame of the panoramic video into plural corresponding frame segments; and
      separately encode each frame segment of the panoramic video frames, wherein said encoding comprises compressing a series of said corresponding frame segments, and wherein encoding the frame regions of the panoramic video comprises creating at least one data file comprising the data associated with each frame region of each frame of the panoramic video and appending an indicator to the data of each frame region that identifies its corresponding panoramic video frame and its location within that frame.

16. A computer-readable medium having computer-executable instructions for encoding frames of a panoramic video so as to allow selective decoding of the frames, said computer-executable instructions comprising:
   segmenting each frame of the panoramic video into plural corresponding frame segments; and
   separately encoding each frame segment of the panoramic video frames, wherein encoding the frame regions of the panoramic video comprises creating at least one data file comprising the data associated with each frame region of each frame of the panoramic video and an indicator appended to the data of each frame region that identifies its corresponding panoramic video frame and its location within that frame.

17. A process of encoding images so as to allow for selective decoding of portions of the image, comprising the process actions of:
   segmenting the image into plural corresponding segments; and
   encoding each image segment separately, wherein the process action of encoding the image segments of the image comprises the action of creating at least one data file comprising the data associated with each image segment and an indicator appended to the data of each image segment that identifies its location within the image.

18. The process of claim 17, further comprising the action of decoding only those encoded segments of the image needed to display a prescribed portion of the scene depicted by the image.

19. The process of claim 17, wherein the process action of separately encoding each segment further comprises the process action of separately compressing each segment of the image.

20. The process action of claim 17, further comprising the process actions of:
   obtaining information as to what portion of a scene depicted by the image a user wants to view;
   sending only those image segments that are needed by an image viewer to provide the portion of the scene the user wants to view.

21. The process of claim 17, wherein the process action of creating at least one data file further comprises an action of creating a separate data file for each image segment of the image.

22. The process of claim 21, wherein the process action of creating at least one data file comprises an action of creating a single data file comprising the data and indicators associated with each image segment of the image.

23. The process of claim 21, further comprising a process action of sending the at least one data file from a server over a network to an image viewer resident on a client.

24. The process of claim 23, wherein a user viewing an image on the image viewer views only a portion of the scene captured by the image, and wherein the viewer identifies what portion of the scene the user wants to view, and where the process action of sending the at least one data file over the network comprises an action of sending all of the data files so as to provide every image segment to the viewer.

25. The process of claim 24, wherein there is two-way communication between the server and the client.

26. The process action of claim 25, wherein a user viewing an image on the image viewer views only a portion of the scene captured by the image, and wherein the viewer identifies what portion of the scene the user wants to view, and wherein the viewer employs said two-way communication link to the server to request only those image segments needed to provided the desired view to the user and wherein the process action of creating the at least one data file comprises an action of including only the data and associated indicators corresponding to those image segments requested by the viewer in the at least one data file sent to the viewer.

27. The process of claim 17, further comprises the process action of storing the at least one data file on a storage medium accessible by an image viewer.

28. The process action of claim 27, wherein a user viewing an image on the image viewer views only a portion of the scene captured by the image, and wherein the viewer identifies what portion of the scene the user wants to view, and further comprising the process action of the viewer reading only the elements of the at least one data file corresponding to those image segments needed to produce the portion of the scene the user wants to view.

* * * * *

UNITED STATES PATENT AND TRADEMARK OFFICE
CERTIFICATE OF CORRECTION

PATENT NO. : 6,859,557 B1
APPLICATION NO. : 09/611649
DATED : February 22, 2005
INVENTOR(S) : Uyttendaele et al.

Page 1 of 1

It is certified that error appears in the above-identified patent and that said Letters Patent is hereby corrected as shown below:

On the title page, item (56), under "Other Publications", column 1, line 1, delete "Afast" and insert -- A fast --, therefor.

In column 2, line 48, delete "Altemately" and insert -- Alternately --, therefor.

In column 8, line 25, after "the" delete "o".

In column 8, line 52, after "the" insert -- viewer at --.

In column 8, line 53, delete "Wherfore" and insert -- Wherefore --, therefor.

In column 8, line 54, delete "ic" and insert -- is --, therefor.

Signed and Sealed this

Eighth Day of September, 2009

David J. Kappos
*Director of the United States Patent and Trademark Office*